United States Patent Office 3,475,112
Patented Oct. 28, 1969

3,475,112
PROCESS OF CLEANING SOILED POULTRY
FEATHERS
Karl Mahall, Dusseldorf, Germany, assignor to Henkel
& Cie. G.m.b.H., Dusseldorf, Germany, a corporation
of Germany
No Drawing. Filed Apr. 24, 1967, Ser. No. 632,904
Claims priority, application Germany, June 16, 1966,
H 59,690
Int. Cl. D06l 1/22
U.S. Cl. 8—94.10   8 Claims

ABSTRACT OF THE DISCLOSURE

Process for cleaning soiled poultry feathers to obtain an odorless and easily gradable feather product by washing, rinsing and steaming, the rinsing liquor containing a synergistic mixture of a pyridine base and a surface-active quaternary ammonium compound.

PRIOR ART

The cleaning of fresh poultry feathers to obtain a feather product which can be used for bed feathers, stuffing of pillows and the like is usually in a cleaning process consisting of several successive operations. The said process consists of first washing the raw feather material at normal or slightly elevated temperatures with an aqueous solution containing a non-ionic and/or anion surface-active washing agent, then rinsing of the feathers usually with the addition of a bluing agent and, if desired, pyridine compounds to remove or reduce the odor and then steaming the feathers in a vapor drum and, if desired, spraying onto the feathers an antistatic agent to facilitate the sorting in the grading machine. The sorting or grading is done by passing an air current through the feathers to separate them into downs, semi-downs and coarse feathers.

This well-known cleansing process works well on raw feather material which is not too greasy or soiled and which is usually obtained from free-running fowl and a well separated, odorless product which can be graded in the grading machine without difficulty is obtained. However, the feathers from so-called high grade fattened poultry which have been brought to market in increasing numbers recently are extemely soiled and highly greasy. These latter feathers cannot be sufficiently cleaned by the above method nor can they be processed into a product of serviceable quality. If the amount of detergent in the washing solution is increased, a very sticky product with an offensive odor is obtained and the said product is practically unsaleable.

OBJECTS OF THE INVENTION

It is an object of the invention to provide an improved process for the cleaning of poultry feathers without substantially changing the apparatus and the cleaning time of known processes.

It is another object of the invention to provide a process for cleaning highly soiled poultry feathers to obtain a good quality feather product.

These and other objects and advantages of the invention will become obvious from the following detailed description.

THE INVENTION

The process of the invention for cleaning poultry feathers comprises washing the raw feathers in an aqueous solution containing a detergent selected from the group consisting of non-ionic detergents, anionic detergents and mixtures thereof, rinsing the washed feathers in an aqueous rinse solution and steaming the feathers to obtain an easily gradable feather product, the improvement which comprises adding to the rinse solution 0.2 to 2.0 gm./liter of a pyridine and 0.05 to 0.5 gm./liter of a surface-active, quaternary ammonium compound having at least one high molecular weight radical of 8 to 20 carbon atoms, preferable 12 to 18 carbons atoms.

The process of the invention makes it possible to obtain a perfectly separated, easily gradable product free from odors even from badly soiled feathers containing dirt and 10 to 12% by weight of grease. These feathers up to now have been considered useless for the most part. Surprisingly, the sole addition of a pyridine base to the rinse solution or to the washing solution even with subsequent spraying of an antistatic agent in the steam drum does not produce such a satisfactory result. The effect obtained by the mixture of pyridine bases and surface-active quaternary ammonium compounds in the final rinsing solution is a synergistic action of the two components.

The pyridine base may be pyridine, picolines, commercial pyridine bases which are largely picolines and other lower alkyl homologues of pyridine.

The surface-active quaternary ammonium compounds have at least one radical of 8 to 20 carbon atoms selected from the group consisting of aliphatic, aliphatic-cycloaliphatic and aliphatic-aromatic radicals attached to the quaternary ammonium nitrogen atom. The said radical can be interrupted by hetero atoms such as oxygen, sulfur or nitrogen or hetero atom groups such as —COO— and —COON<. Examples of suitable surface-active quaternary ammonium compounds are heterocyclic compounds such as dodecylpyridinium chloride, hexadecylquinolinium phosphate, cocoaalkylpyridinium sulfate wherein the cocoaalkyl radical has 12 to 18 carbon atoms; aliphatic compounds such as trimethylhexadecylammonium sulfate,
octadecylaminoethyltrimethylammonium bisulfate,
stearoylamidoethyltrimethylammonium methosulfate,
dodecyloxymethyltrimethylammonium chloride,
octadecyldimethylammonium chloride,
oleyltri-(hydroxyethyl)-ammonium chloride, etc.;

and aliphatic aromatic compounds such as octadecylphenyldimethylammonium sulfate, etc.

Preferably, the surface-active quaternary ammonium compounds used in the process of the invention have the formula

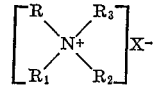

wherein X is the anion of an organic or inorganic acid, R is selected from the group consisting of aliphatic, aliphatic-cycloaliphatic and aliphatic-aromatic radicals of 8 to 20 carbon atoms which may be interrupted with a member selected from the group consisting of —O—, —S—, —N<, —COO— and —COON<, and $R_1$, $R_2$ and $R_3$ are selected from the group consisting of lower alkyl and hydroxy lower alkyl and when taken together with the nitrogen atom to which they are attached form a heteocyclic ring which may be fused to 1 or 2 other rings.

The mixture of pyridine base and surface-active quaternary ammonium compound is preferably added to the final rinse solution in a total amount of 0.25 to 2.5 gm./liter and the ratio of pyridine base to quaternary ammonium compound may vary within wide limits, but a ratio of 10:1 to 1:1 is preferred. In automatic or semi-automatic cleaning plants, the addition of the synergistic mixture is advantageously made in the form of an alcoholic or aqueous-alcoholic solution which can be directly metered by an automatic dosing device into the rinse water. However, the said components can be added directly as such to the rinse water simultaneously or at spaced intervals. Preferably, the feathers remain in contact with the said rinse solution sufficiently long to allow the synergistic mixture to act to the fullest extent. This is usually of the order of 2 to 10 minutes.

The anionic and non-ionic detergents used in the washing solution are well known. Examples of suitable detergents are non-ionic compositions such as condensation products of 2 to 30 moles of ethylene oxide with aliphatic, aromatic or cycloaliphatic compounds with a reactive hydrogen atom such as alcohols, mercaptan, amides, amines, etc. The detergents can contain the usual building agents, etc., such as alkali metal hexametaphosphates, alkali metal sulfates, alkali metal carbonates, etc.

In the following examples there are described several preferred embodiments to illustrate the invention. However, it should be understood that the invention is not intended to be limited to the specific embodiments.

EXAMPLE I 70 kg. of greasy, sticky feathers from fattened poultry and having a very strong odor were treated for 15 minutes in 2500 liters of a washing liquor at 40° C. containing 1.5 kg. of the condensation product of 8 moles of ethylene oxide with 1 mole of nonylphenol, 0.75 kg. of a non-ionic wetting agent based on hydroxyethoxylated fatty alcohols, 0.8 kg. of sodium hexametaphosphate, 2.0 kg. of sodium sulfate and 2.0 kg. of a commercial pyridine base consisting essentially of picolines. Then, the feathers were rinsed by passing them through water heated to 35° C. for 5–10 minutes and then through cold water for 20 minutes. After the drain valve of the rinsing apparatus had been closed, 0.2 kg. of dioctadecyldimethylammonium chloride in the form of a 20% aqueous-alcoholic solution and a small amount of N-blue methylviolet (bluing agent) were added to the feathers. After 3 minutes, 1.0 kg. of a commercial pyridine base consisting essentially of picolines was added to the feathers and after another 2 minutes, the feathers were drained and treated with steam. The resulting feather material was practically odorless and was easily gradable.

EXAMPLE II 60 kg. of exceedingly greasy and soiled gray duck feathers which could not be satisfactorily cleaned by the usual washing methods were washed in 3500 liters of a cold washing solution containing 3.5 kg. of the condensation product of 9 moles of ethylene oxide with 1 mole of a mixture of fatty alcohols having 12 to 18 carbon atoms, 1.0 kg. of sodium carbonate and 1.0 kg. of pyridine. The washed feathers were then rinsed in cold water and after the drain valve was closed, 1.5 kg. of cetylpyridinium chloride in the form of a 20% aqueous alcoholic solution and 2.5 kg. of pyridine were added thereto. After a reaction time of 5 minutes, the feathers were drained and steamed to obtain a clean, very loose feather material which was odorless and easily gradable.

EXAMPLE III 60 kg. of fattened geese feathers having a high content of grease and which could not be satisfactorily cleaned by the usual cleaning process were washed for 15 minutes in 3500 liters of a cold aqueous liquor containing 2 kg. of the condensation product of 8 moles of ethylene oxide with 1 mole of nonylphenol, 1 kg. of the condensation product of 3 moles of ethylene oxide with 1 mole of decyl alcohol and 1 kg. of sodium carbonate. Then the feathers were rinsed in cold water until the wash water was entirely clear. After the drain valve was closed, a small amount of N-blue methylviolet, 1.5 kg. of cetylpyridinium chloride in the form of a 20% aqueous alcoholic solution and 1 kg. of a commercial pyridine base were successively added to the feathers and the mixture was allowed to stand for 3 to 5 minutes. The feathers were then centrifuged and steamed to obtain a clean, easily gradable feather material. The downs were voluminous, odorless and fluffy.

Various modifications of the process of the invention may be made without departing from the spirit or scope thereof and it is to be understood that the invention is intended to be limited only as defined in the appended claims.

I claim:

1. In a process for cleaning poultry feathers comprising washing the raw feathers in an aqueous solution containing a detergent selected from the group consisting of non-ionic detergents, anionic detergents and mixtures thereof, rinsing the washed feathers in an aqueous rinse solution and steaming the feathers to obtain an easily gradable feather product, the improvement which comprises adding to the rinse solution 0.2 to 2.0 gm./liter of a pyridine and 0.05 to 0.5 gm./liter of a surface-active, quaternary ammonium compound having at least one high molecular weight radical of 8 to 20 carbon atoms.

2. The process of claim 1 wherein the high molecular weight radical has 12 to 18 carbon atoms.

3. The process of claim 1 wherein the pyridine base is pyridine.

4. The process of claim 1 wherein the pyridine base is a mixture of picolines.

5. The process of claim 1 wherein the ratio of pyridine base to quaternary ammonium compound is 10:1 to 1:1.

6. The process of claim 1 wherein the poultry feathers are from fattened poultry.

7. The process of claim 1 wherein the total amount of pyridine base and quaternary ammonium compound added to the rinse solution is 0.25 to 2.5 gm. per liter.

8. The process of claim 1 wherein the pyridine base and the quaternary ammonium compound are added as a solution in a solvent selected from the group consisting of alcohol and aqueous alcohol.

References Cited

UNITED STATES PATENTS

| 2,937,918 | 5/1960 | Pasternak | 8—94.10 |
| 2,937,920 | 5/1960 | Pasternak | 8—94.10 |

MORRIS O. WOLK, Primary Examiner

JOSEPH T. ZATARGA, Assistant Examiner

U.S. Cl. X.R.

34—2; 134—25